US009015118B2

(12) United States Patent
Velasco

(10) Patent No.: US 9,015,118 B2
(45) Date of Patent: Apr. 21, 2015

(54) DETERMINING AND PRESENTING PROVENANCE AND LINEAGE FOR CONTENT IN A CONTENT MANAGEMENT SYSTEM

(75) Inventor: Marc B. Velasco, Orange, CA (US)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 13/183,847

(22) Filed: Jul. 15, 2011

(65) Prior Publication Data
US 2013/0018848 A1 Jan. 17, 2013

(51) Int. Cl.
G06F 7/00 (2006.01)
G06F 17/30 (2006.01)

(52) U.S. Cl.
CPC ................. *G06F 17/30011* (2013.01)

(58) Field of Classification Search
CPC . G06F 17/30; G06F 17/30309; G06F 17/301; G06F 17/30368; G06F 21/316; G06F 2221/2101
See application file for complete search history.

(56) References Cited

U.S. PATENT DOCUMENTS

| 5,806,078 | A | * | 9/1998 | Hug et al. ............ 715/205 |
| 5,890,164 | A | * | 3/1999 | Nielsen ................... 1/1 |
| 5,999,947 | A | | 12/1999 | Zollinger et al. |
| 6,108,670 | A | | 8/2000 | Weida et al. |
| 6,681,369 | B2 | | 1/2004 | Meunier et al. |
| 7,051,009 | B2 | | 5/2006 | Suermondt et al. |
| 7,610,545 | B2 | | 10/2009 | Wagner et al. |
| 7,693,864 | B1 | | 4/2010 | Pasupathy et al. |
| 7,721,259 | B2 | | 5/2010 | Heinke et al. |
| 8,250,037 | B2 | | 8/2012 | Andersen et al. |
| 8,284,198 | B1 | | 10/2012 | Hackworth et al. |
| 2005/0060281 | A1 | | 3/2005 | Bucher et al. |

(Continued)

FOREIGN PATENT DOCUMENTS

| CN | 1794207 A | 6/2006 |
| WO | 06026636 A2 | 3/2006 |
| WO | 2011150027 | 1/2011 |

OTHER PUBLICATIONS

U.S. Appl. No. 13/183,840.

(Continued)

*Primary Examiner* — Fred I Ehichioya
*Assistant Examiner* — Hasanul Mobin
(74) *Attorney, Agent, or Firm* — Farrakh Pourmirzaie; Edell, Shapiro & Finnan, LLC

(57) ABSTRACT

Methods and apparatus, including computer program products, implementing and using techniques for determining provenance and lineage for content elements in a content management system. An option to track provenance and lineage data for the content element is provided in response to a content element being entered into a content management system. A provenance metadata attribute and a lineage metadata attribute are associated with the content element in response to selecting the option to track provenance and lineage data. An extent of difference is determined between the original content element and the changed content element in response to a change of content being made to the content element. The provenance metadata attribute is updated to reflect the determined extent of difference. It is determined what user changed the content element, and the lineage metadata attribute is updated to reflect the user's involvement in changing the content element.

20 Claims, 2 Drawing Sheets

(56) References Cited

U.S. PATENT DOCUMENTS

| | | | |
|---|---|---|---|
| 2005/0154761 A1* | 7/2005 | Lee et al. | 707/104.1 |
| 2006/0004886 A1* | 1/2006 | Green et al. | 707/203 |
| 2006/0080369 A1* | 4/2006 | Razdow et al. | 707/204 |
| 2006/0143243 A1 | 6/2006 | Polo-Malouvier et al. | |
| 2006/0288081 A1 | 12/2006 | Sung et al. | |
| 2007/0088957 A1* | 4/2007 | Carson | 713/176 |
| 2007/0118572 A1* | 5/2007 | Fischer et al. | 707/201 |
| 2007/0294246 A1 | 12/2007 | Evans et al. | |
| 2008/0021922 A1 | 1/2008 | Hailpern et al. | |
| 2008/0040388 A1* | 2/2008 | Petri et al. | 707/104.1 |
| 2008/0126399 A1 | 5/2008 | MacGregor | |
| 2008/0177755 A1 | 7/2008 | Stern et al. | |
| 2008/0178302 A1 | 7/2008 | Brock et al. | |
| 2008/0201381 A1 | 8/2008 | Desai et al. | |
| 2009/0024608 A1 | 1/2009 | Deolalikar | |
| 2009/0125382 A1 | 5/2009 | Delepet | |
| 2009/0182780 A1* | 7/2009 | Wong et al. | 707/200 |
| 2009/0199090 A1 | 8/2009 | Poston et al. | |
| 2009/0204595 A1 | 8/2009 | Dombrowski | |
| 2009/0234833 A1 | 9/2009 | Davis, II et al. | |
| 2009/0307137 A1 | 12/2009 | White et al. | |
| 2010/0107244 A1 | 4/2010 | Li et al. | |
| 2010/0114628 A1 | 5/2010 | Adler et al. | |
| 2010/0251374 A1 | 9/2010 | Dill et al. | |
| 2010/0287204 A1 | 11/2010 | Amini et al. | |
| 2010/0299339 A1 | 11/2010 | Kementsietsidis et al. | |
| 2011/0047056 A1 | 2/2011 | Overman et al. | |
| 2011/0296507 A1 | 12/2011 | Khosrowshahi | |
| 2012/0254048 A1 | 10/2012 | Roberts et al. | |
| 2012/0254128 A1 | 10/2012 | Bath et al. | |
| 2013/0018848 A1 | 1/2013 | Velasco | |
| 2013/0018858 A1 | 1/2013 | Velasco | |
| 2013/0018873 A1 | 1/2013 | Velasco | |
| 2013/0198145 A1 | 8/2013 | Avery et al. | |
| 2014/0025645 A1 | 1/2014 | Brown et al. | |
| 2014/0280204 A1 | 9/2014 | Avery et al. | |

OTHER PUBLICATIONS

U.S. Appl. No. 13/183,850.
U.S. Appl. No. 13/358,594.
Friedrich II, John R, "Meta-data Version and Configuration Management in Multi-Vendor Environments", Proceedings of the ACM SIGMOD International Conference on Management of Data, p. 799-804, 2005, SIGMOD 2005: Proceedings of the ACM SIGMOD International Conference on Management of Data, ACMs.
FortiDB Version 3.2 Metadata Monitor User Guide, www.fortinet.com, Dec. 19, 2008.
M. Gao, "Recording How-Provenance on Probabilistic Databases", 2010 12th International Asia-Pacific Web Conference, Shanghai, China, pp. 205-211.
P. Groth, "A Distributed Algorithm for Determining the Provenance of Data", Fourth IEEE International Conference on eScience, 2008, pp. 166-173.
IBM, ip.com PriorArtDatabase, "System and Methods to Enable Trusted Provenance Tracking and Rights/Responsibilities Evaluation in Collaborative Developing Environment", Oct. 17, 2006 (8 pages).
Y. Simmhan, "A Framework for Collecting Provenance in Data-Centric Scientific Workflows", IEEE International Conference on Web Services, 2006, Bloomington, IN, (8 pages).
U.S. Appl. No. 13/555,559.
International Search Report and Written Opinion in International Application No. PCT/IB2012/052734, mailed Oct. 18, 2012.
International Search Report and Written Opinion, PCT/EP2013/050160, May 6, 2013, 8 pages.

* cited by examiner

DETERMINING AND PRESENTING PROVENANCE AND LINEAGE FOR CONTENT IN A CONTENT MANAGEMENT SYSTEM

CROSS-REFERENCE TO RELATED APPLICATIONS

This application is a non-provisional application that is related to (1) U.S. patent application Ser. No. 13/183,840, filed on the same date herewith, and entitled "Versioning of Metadata, Including Presentation of Provenance and Lineage for Versioned Metadata"; and (2) U.S. patent application Ser. No. 13/183,850, filed on the same date herewith, and entitled "Use and Enforcement of Provenance and Lineage Constraints"; the entire contents of each of which is hereby incorporated herein by reference.

BACKGROUND

The present invention relates to content management systems (CMSs), and more specifically, to the use of provenance and lineage data in CMSs. CMSs are used in collaborative environments, such as workplaces or various types of organizations to manage workflow. Typically, CMSs are implemented on various types of computer systems and include data stored in databases, along with analytical processing tools that can process the data to derive valuable results for the organization.

In a CMS, data can be defined as nearly anything: documents, movies, pictures, phone numbers, scientific data, and so forth. CMSs are frequently used for storing, controlling, revising, semantically enriching, and publishing documentation. CMS s can allow for a large number of people to contribute to and share stored data; control access to data, based on user roles (defining which information users or user groups can view, edit, publish, etc.); aid in easy storage and retrieval of data; reduce repetitive duplicate input; improve the ease of report writing; and improve communication between users, just to mention a few examples.

Serving as a central repository, the CMS typically increases the version level of new updates to an already existing file. Expressed differently, the CMS has the ability to collect and track data for content in the CMS, which may include authors, change dates and file versions.

SUMMARY

According to one embodiment of the present invention, methods, apparatus and systems, including computer program products are provided for determining provenance and lineage indicators for content elements in a content management system. An option to track provenance and lineage data for the content element is provided in response to a content element being entered into a content management system. A provenance metadata attribute and a lineage metadata attribute are associated with the content element in response to selecting the option to track provenance and lineage data. An extent of difference is determined between the original content element and the changed content element in response to a change of content being made to the content element. The provenance metadata attribute is updated to reflect the determined extent of difference. It is determined what user changed the content element, and the lineage metadata attribute is updated to reflect the user's involvement in changing the content element.

The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

Overview

Figure 1:
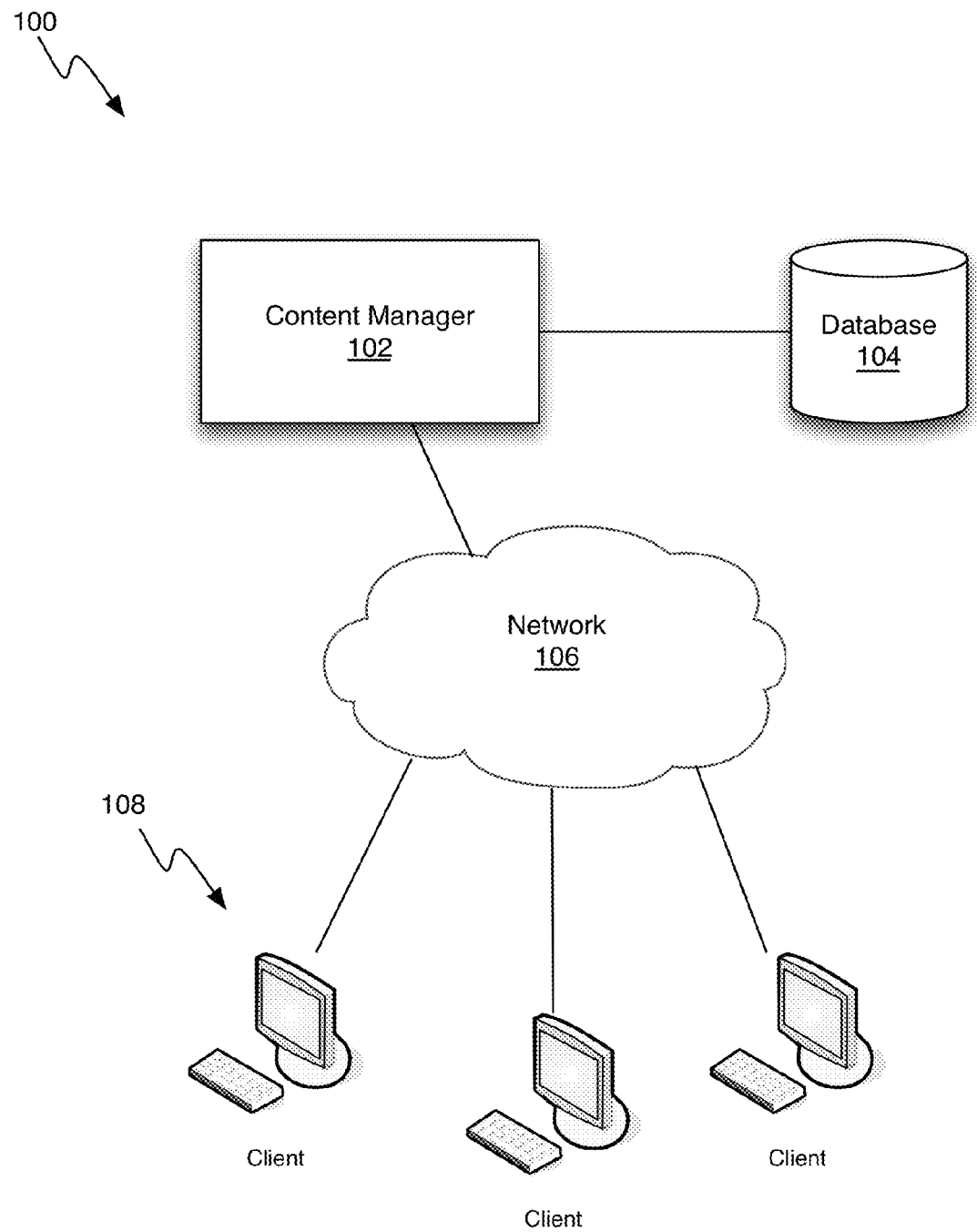
FIG. 1 shows a schematic view of a CMS (100) in which the various embodiments of the invention can be implemented.

Technology developments in recent years have made it possible to collect and store large amounts of data for a variety of purposes, such as technological, economic, and regulatory purposes. As a result of the ability to collect and store large amounts of data, it has become increasingly important to be able to sift through the collected data to determine what data is useful and accurate, not only from the original ingestion of data, but also throughout the lifecycle of the content.

In an environment where technology and decision-making are increasingly tied together, users must be able to make decisions by analyzing content and data (both historical and real-time). Thus, the provenance and lineage of content will play a major part in the analysis of content and can aid users in ensuring that the content that is presented to them or analyzed by them is accurate and complete. At the very least, users will be able to understand to what extent content has been changed and by whom.

In general terms, a provenance determination can be described as including an authoritative determination about whether content someone is looking at is the same content that was originally entered or captured, and a determination about how similar, if the contents are not identical. A lineage determination can generally be described as including an authoritative trace of the authorship and changes to the data. Because a CMS has the ability to collect and track data for content in the CMS, it is well-suited to adaption, such that the CMS may automatically provide lineage and provenance data for content managed by the CMS.

Some examples of questions that can be answered using lineage and provenance data include: How can I tell whether the content I'm looking at is authentic? How original is the content? Was the content changed as part of a process? Did one person control all the changes to the content or was the content changed as part of a collaborative process? How much content was changed in each individual updates?

In general, the various embodiments described herein relate to methods, apparatus and systems, which have the ability to calculate and display provenance and lineage for content, and which thus can be used at least in part to solve the above and other questions. These provenance and lineage for content can be displayed to users, for example, similar to how other metadata such as document name and document size can be displayed. In some implementations, the provenance and lineage data can be used as part of an analytical process to determine whether content meets certain criteria. For example, a user might want to only use content having provenance values of 80% or above for a certain purpose, that is, content (for example, a document) which is 80% identical to what it was when the content was first checked in or captured into the CMS.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Gathering and Calculating Provenance and Lineage Data

FIG. 1 shows a schematic overview of one embodiment of a CMS (100) in which the various embodiments of the invention can be realized. As can be seen in FIG. 1, the CMS (100) stores and manages content for end-users. In some embodiments the content storage and management can be transparent to the end-users. A content manager (102) controls versioning, metadata, and organization of content that users (108) load into the CMS (100). Typically the CMS (100) uses a database backend (104) for storing content and associated metadata. The users (108) can communicate with the content manager (102) over a network (106), and the content manager (102) in turn communicates with the database (104) to retrieve and save content per the users' requests.

In some embodiments, when content is added to the CMS (100), an option is presented to the user (108) to track provenance and lineage data for the content and/or metadata related to the content. Depending on the specific embodiment, this option can be enabled by default or can be explicitly selected by the user, as needed. Furthermore, the option to track provenance and lineage data for content and/or metadata can be enabled or disabled only for content of particular types, depending on the specific needs of the users of the CMS. For example, for a draft document that is expected to go through many revisions, it may not be very important to track lineage and provenance due to the collaborative nature of the expected edits and changes. Another example can be a test plan where many users contribute content. In such a case, provenance and lineage values will not necessarily be very useful and the feature can be turned off. Many other examples can be envisioned by those of ordinary skill in the art based on the nature of the contents and collaboration in the CMS (100).

In order to successfully track provenance and lineage data for a piece of content, it is important to be able to determine not only what changes have occurred between two versions of the same piece of content, but also who made what changes to the piece of content. The raw data for this is typically available through previous versions of a piece of content. The CMS in accordance with the various embodiments of the invention uses this raw data to calculate values for provenance and lineage of content, as will be further described in detail below.

When a piece of content is entered into a CMS, it typically has an associated inherent set of metadata. For example, metadata for a document can include a document name, the date the document was created, by whom the document was created, etc. In accordance with various embodiments of the invention, the CMS creates two additional attributes of metadata for the content's provenance and lineage characteristics. Each piece of content will have an associated additional provenance metadata attribute and a lineage metadata attribute. To ensure authenticity, the provenance metadata attribute and the lineage metadata attribute are only system accessible, such that only the CMS can update the provenance and lineage metadata attributes once they have been created.

As was briefly mentioned above, in some embodiments users can be permitted to turn off the provenance and lineage tracking, for example, while a document is undergoing significant collaboration and changes. Then after things have settled down and the document is complete, the provenance and lineage tracking can be enabled. This permits the accommodation of dynamic changes until the content is mature, after which the content can be "locked down" and thereby be made into an authoritative piece of content.

Figure 2:
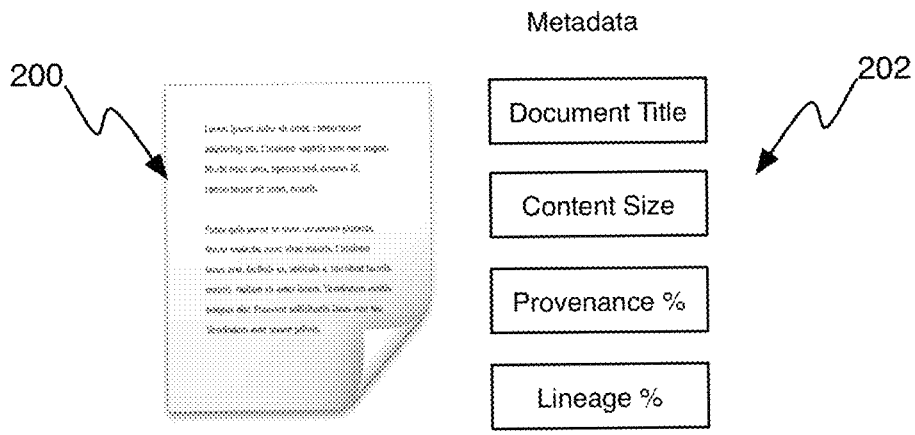
FIG. 2 shows a schematic view of an original document and associated metadata in a CMS, in accordance with one embodiment.

FIG. 2 shows a schematic view of an icon (200) representing a document in a CMS and associated metadata (202). As can be seen in FIG. 2, the metadata (202) for the document (200) includes document title, content size, provenance percentage and lineage percentage. The metadata (202) can be displayed to a user in various conventional ways that are used to display metadata, for example, by "right-clicking" the document (200) with a computer mouse, or in a pop-up box that shows up when hovering over the document with the mouse, etc.

In some implementations, when a document or other piece of content is added to the CMS, the provenance and lineage data fields are initially set to 100%, which indicates both that 100% of the document is complete and unaltered, and that 100% of the document's authorship is from a single source. Now assume a different user comes along and checks out the document, makes an update to the document, and checks the updated document back into the CMS. This updated version of the document is now the current version of the document. The previous version is still accessible from the CMS, but is clearly marked as a previous version of the current version.

As a content element (e.g., a document, a picture, a scanned document, etc.) is updated and a new version is created, a difference is determined between the latest version that was just checked into the CMS and the original version. This difference is determined both in terms of character differences and in a binary form depending on the type of content. The reason for determining differences both in terms of characters and in a binary form is that content might look textually identical between a first and a second version of the same content, but yet there may be binary data present that does not render into text, for example, if a document or other file has been compromised with a virus or some other type of malicious code. In such situations a binary comparison can reveal differences that are not detectable through a textual comparison only.

The difference processing between the two versions of the content results in an overall number as to how much is different, i.e., an extent of difference, between the original content and the new content. As an example, if a 10-line document of text is checked in, and a second user subsequently checks out this document and removes 5 lines, a difference between the two versions shows a loss of 5 lines from the original content. Thus, the provenance will go down to 50%, meaning that only 50% of the original content remains. In some embodiments, the number can be converted into a percentage representing how much of the original content is now in the latest version of the content element. This percentage value is then updated into the provenance metadata attribute. The results of the difference processing can also be presented in other ways than a percentage value or numerical figure. For example, for text documents, there can be various types of "intelligent reporting" of the changes that triggered the provenance and lineage changes, such as denoting which user made which changes, for example. Many ways in which such comparative data can be displayed is familiar to those of ordinary skill in the art.

Figure 3:
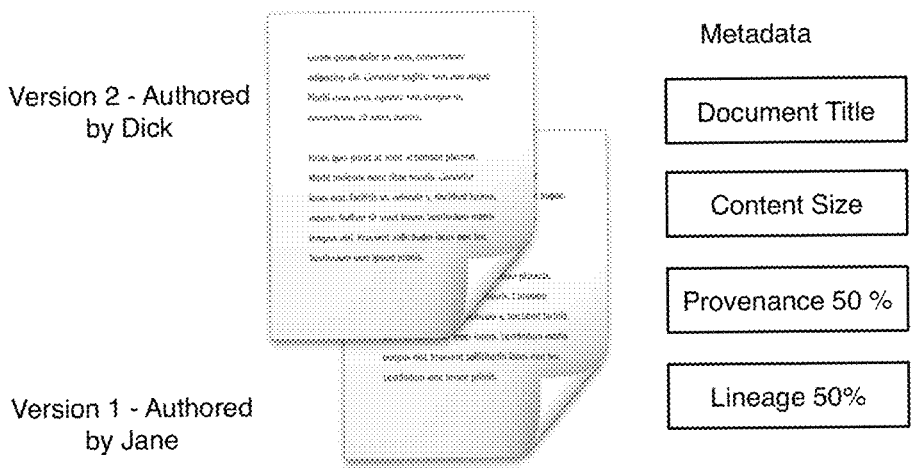
FIG. 3 shows a schematic view of two versions of a document and associated metadata in a CMS, in accordance with one embodiment.

Additionally, during the content update operation, in the event that the ownership of the new version is updated, the lineage metadata attribute will also be updated as a percentage. The percentage indicates how much of the content element from the original version to the latest version has been authored by different users. This is schematically illustrated in FIG. 3. For example, as can be seen in FIG. 3, if there were two users who have checked out and checked in a document, then the lineage will be reported as 50%. Similarly, if there were three authors over the life of the document, then the lineage would be 33%.

Displaying Provenance and Lineage Data

The CMS in accordance with the various embodiments described above will set the provenance and lineage metadata based on calculations and actions performed above. These values can in turn be used to display as needed to users through Graphical User Interfaces (GUIs), portals etc. Since they appear as standard metadata they can be accessed and displayed like any other piece of metadata. In some embodiments, various types of color-coding can be used in addition to or instead of displaying percentage values. For example, a green icon might indicate 100% provenance, a yellow icon might indicate 50% provenance and a red icon might indicate less than 25% provenance and thus serve as a potential warning to a user about the contents of a document.

Concluding Comments

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

For example, instead of equally dividing the lineage between the number of users that edit a document or some other content, in some embodiments the CMS can keep track of the extent of the changes made by each user when determining the lineage metadata value. This can be useful in a situation where a first user, e.g. the main author of a document, does 95% of the edits and a couple of reviewers together only make 5% of the edits. In such a situation, it may be appropriate to display a higher lineage metadata value than 33%. Many similar variations can be envisioned by those of ordinary skill in the art.

Furthermore, in some embodiments it can be possible to reset the provenance and/or lineage metadata attributes, so for example content that is now "mature" can be identified by resetting the provenance and lineage metadata to 100%. Accordingly, other embodiments fall within the scope of the appended claims.

The invention claimed is:

1. A computer-implemented method comprising:
   associating a provenance metadata attribute and a lineage metadata attribute with a content element provided by a source, wherein the provenance metadata attribute comprises a value that changes as provenance of the content element changes and the lineage metadata attribute comprises a value that changes as lineage of the content element changes;
   in response to a change of content being made to the content element resulting in a changed content element, determining an extent of difference between the content element and the changed content element and updating the value of the provenance metadata attribute to reflect the determined extent of difference;
   in response to a change in the content element by a different source, updating the value of the lineage metadata attribute to reflect the different source's involvement in changing the content element; and
   in response to originally entering the content element by the source to a content management system:
      setting the value of the provenance metadata attribute of the content element to an initial provenance value that indicates the content element is an original version that has not yet been altered; and
      setting the value of the lineage metadata attribute of the content element to an initial lineage value that indicates authorship of the content element is from a single source.

2. The method of claim 1, wherein the provenance metadata attribute and lineage metadata attribute are accessible by the content management system only.

3. The method of claim 1, wherein the extent of difference between the content element and the changed content element is determined by determining an extent of difference in textual content between the content element and the changed content element.

4. The method of claim 1, wherein the difference between the content element and the changed content element is determined by determining an extent of difference between a binary representation of the content element and the changed content element.

5. The method of claim 1, further comprising:
   displaying the value of the provenance metadata attribute and the value of the lineage metadata attribute as one of a percentage, a graphical representation, and a numerical value.

6. The method of claim 1, further comprising:
   setting the value of the provenance metadata attribute and the value of the lineage metadata attribute of the content element to 100% when originally entering the content element by the source to the content management system.

7. The method of claim 1, wherein updating the value of the lineage metadata attribute to reflect the different source's involvement in changing the content element further comprises:
   taking into account an extent to which each different source among a plurality of different sources was involved in changing the content element and updating the value of the lineage metadata attribute to reflect the extent to which each different source was involved in changing the content element.

8. The method of claim 1, further comprising resetting one or more of the value of the provenance metadata attribute and the value of the lineage metadata attribute.

9. A computer program product comprising:
   a tangible computer readable storage device having computer usable program code embodied therewith, the computer usable program code being configured to:
   associate a provenance metadata attribute and a lineage metadata attribute with a content element provided by a source, wherein the provenance metadata attribute comprises a value that changes as provenance of the content element changes and the lineage metadata attribute comprises a value that changes as lineage of the content element changes;
   determine an extent of difference between the content element and a changed content element and update the value of the provenance metadata attribute to reflect the determined extent of difference in response to a change of content being made to the content element;
   update the value of the lineage metadata attribute in response to a change in the content element by a different source and to reflect the different source's involvement in changing the content element; and
   in response to the content element being originally entered by the source to a content management system:
      set the value of the provenance metadata attribute of the content element to an initial provenance value that indicates the content element is an original version that has not yet been altered; and
      set the value of the lineage metadata attribute of the content element to an initial lineage value that indicates authorship of the content element is from a single source.

10. The computer program product of claim 9, wherein the computer usable program code is configured to provide access to the provenance metadata attribute and lineage metadata attribute by the content management system only.

11. The computer program product of claim 9, wherein the extent of difference between the content element and the changed content element is determined by determining an extent of difference in textual content between the content element and the changed content element.

12. The computer program product of claim 9, wherein the difference between the content element and the changed content element is determined by determining an extent of difference between a binary representation of the content element and the changed content element.

13. The computer program product of claim 9, wherein the computer usable program code is further configured to:
display the value of the provenance metadata attribute and the value of the lineage metadata attribute as one of a percentage, a graphical representation, and a numerical value.

14. The computer program product of claim 9, wherein the computer usable program code is further configured to:
set the value of the provenance metadata attribute and the value of the lineage metadata attribute of the content element to 100% when originally entering the content element by the source to the content management system.

15. The computer program product of claim 9, wherein the computer usable program code is further configured to update the value of the lineage metadata attribute to reflect the different source's involvement in changing the content element by:
taking into account an extent to which each different source among a plurality of different sources was involved in changing the content element and updating the value of the lineage metadata attribute to reflect the extent to which each different source was involved in changing the content element.

16. The computer program product of claim 9, the computer usable program code is further configured to reset one or more of the value of the provenance metadata attribute and the value of the lineage metadata attribute.

17. A system comprising:
a processor; and
a memory containing instructions that when executed by the processor cause the following actions to be performed:
associating a provenance metadata attribute and a lineage metadata attribute with a content element provided by a source, wherein the provenance metadata attribute comprises a value that changes as provenance of the content element changes and the lineage metadata attribute comprises a value that changes as lineage of the content element changes;
in response to a change of content being made to the content element resulting in a changed content element, determining an extent of difference between the content element and the changed content element and updating the value of the provenance metadata attribute to reflect the determined extent of difference;
in response to a change in the content element by a different source, updating the value of the lineage metadata attribute to reflect the different source's involvement in changing the content element; and
in response to the content element being originally entered by the source:
set the value of the provenance metadata attribute of the content element to an initial provenance value that indicates the content element is an original version that has not yet been altered; and
set the value of the lineage metadata attribute of the content element to an initial lineage value that indicates authorship of the content element is from a single source.

18. The system of claim 17, wherein the extent of difference between the content element and the changed content element is determined by determining an extent of difference in textual content between the content element and the changed content element.

19. The system of claim 17, wherein the difference between the content element and the changed content element is determined by determining an extent of difference between a binary representation of the content element and the changed content element.

20. The system of claim 17, wherein the memory further contains instructions that when executed by the processor cause the following action to be performed:
displaying the value of the provenance metadata attribute and the value of the lineage metadata attribute as one of a percentage, a graphical representation, and a numerical value.

* * * * *